(12) United States Patent
Taylor et al.

(10) Patent No.: US 10,538,331 B2
(45) Date of Patent: Jan. 21, 2020

(54) RETRACTING HOOKS ASSEMBLY

(71) Applicant: Raytheon Company, Waltham, MA (US)

(72) Inventors: Bill K. Taylor, Tucson, AZ (US); Keith A. Kerns, Tucson, AZ (US); Michael S. Grygla, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 968 days.

(21) Appl. No.: 14/991,347

(22) Filed: Jan. 8, 2016

(65) Prior Publication Data

US 2017/0197716 A1     Jul. 13, 2017

(51) Int. Cl.
    *B64D 1/06*     (2006.01)
    *B64D 1/04*     (2006.01)
    *F16B 2/10*     (2006.01)

(52) U.S. Cl.
    CPC . *B64D 1/04* (2013.01); *F16B 2/10* (2013.01)

(58) Field of Classification Search
    CPC .................................. B64D 1/04; B64D 1/06
    See application file for complete search history.

(56) References Cited

U.S. PATENT DOCUMENTS

| | | | |
|---|---|---|---|
| 2,925,754 A * | 2/1960 | Fillman | B64D 1/04 244/137.4 |
| 3,088,693 A | 5/1963 | Brown | |
| 3,115,059 A | 12/1963 | Moul | |
| 3,153,980 A | 10/1964 | Kongelbeck | |
| 3,242,808 A * | 3/1966 | Nelson | B64D 1/04 244/137.4 |
| 3,967,529 A | 7/1976 | Ingle et al. | |
| 4,257,567 A | 3/1981 | Hasquenoph et al. | |
| 4,346,642 A | 8/1982 | Uhle | |

OTHER PUBLICATIONS

International Search Report and Written Opinion for corresponding Patent Application No. PCT/US2016/046669 dated Oct. 20, 2016.
Juan A. Moreno, Rail Launched Missile/Launcher Mechanical Interface, May 13, 2008, Nato Standardization Agency (NSA), STANAG 3842-AA (Edition 5), 22 pages.

* cited by examiner

*Primary Examiner* — Michael P Ferguson
(74) *Attorney, Agent, or Firm* — Renner, Otto, Boisselle & Sklar, LLP (57) ABSTRACT

A fastening system with a rotatable fastener that may secure an aircraft store to an aircraft and may rotate to reduce a drag coefficient of the aircraft store. Reducing the drag coefficient of the aircraft store may increase fuel efficiency of the aircraft store by requiring less energy to propel the aircraft store at a given speed or acceleration.

The rotatable fastener allows the aircraft store to attach to the aircraft and to possess a low drag coefficient once the aircraft store is deployed. The rotatable fastener member may be configured to conform to attachment interface standards, such as Standardization Agreement ("STANAG") 3842 or any other suitable aircraft store attachment interface standard.

22 Claims, 10 Drawing Sheets

RETRACTING HOOKS ASSEMBLY

GOVERNMENT LICENSE RIGHTS

This invention was made with Government support under contract number FA8650-15-C-8301, awarded by the Department of Defense. The Government has certain rights in the invention.

FIELD OF INVENTION

The present invention relates generally to expendable aircraft stores, and more particularly to a retracting hooks assembly for securing expendable aircraft stores to an aircraft.

BACKGROUND

Missiles are typically attached to an aircraft by a pair of hooks that must withstand large forces based on the weight of the missile and the motion of the aircraft. While the aircraft flies, takes-off, or lands, the aircraft may expose the missile to multiple g-forces, which can multiply the amount of stress experienced by the hooks to maintain the attachment of the missile to the aircraft.

To withstand the large amount of stress, the hooks are typically fixed to the missile. Thus when the missile is launched from the aircraft the hooks often remain protruding outward from an outer skin of the missile.

Some missiles have utilized linearly retractable hooks instead of hooks fixed to the missile. The linearly retractable hooks require a large amount of space and weight within the missile to withstand the large amount of stress endured by the hooks while the aircraft operates.

SUMMARY OF INVENTION

A fastening system with a rotatable fastener is used to secure an aircraft store to an aircraft and may rotate to reduce a drag coefficient of the aircraft store. Reducing the drag coefficient of the aircraft store may increase fuel efficiency of the aircraft store by requiring less energy to propel the aircraft store at a given speed or acceleration.

The rotatable fastener allows the aircraft store to attach to the aircraft and to possess a low drag coefficient once the aircraft store is deployed. The rotatable fastener member may be configured to conform to attachment interface standards, such as Standardization Agreement ("STANAG") 3842 or any other suitable aircraft store attachment interface standard.

The rotatable fastener also may require less space and weight compared with previously known linearly retractable hooks. The space and weight savings may provide fuel efficiencies when transporting the fastening system, and may provide fuel efficiencies when deploying the aircraft store that includes the fastening system.

In an embodiment, the rotatable fastener member includes a leg to form an L-shape that allows the rotatable fastener to distribute stress more efficiently compared to previously known linearly retractable hooks. Distributing the stress allows the rotatable fastener to withstand large stresses caused by operation of the aircraft while maintaining a size and weight compared to known linearly retractable hooks.

In another embodiment the fastening system includes one or more double actuators for locking, unlocking, and actuating the rotatable fastener. The fastening system may include a second rotatable fastener that is locked and unlocked by a first double actuator and actuated by a second double actuator. The first rotatable fastener may be locked and unlocked by the second double actuator and may be actuated by the first double actuator.

According to one aspect of the invention, a fastening system for securing an expendable aircraft store to an aircraft, may include a housing that forms part of the expendable aircraft store, the housing extending along a longitudinal axis, a first fastener rotatably connected to the housing, wherein the first fastener is rotatable about a first fastening axis, and a second fastener rotatably connected to the housing opposite the first fastener relative to the longitudinal axis of the housing, wherein the second fastener is rotatable about a second fastening axis, and wherein the second fastener is rotatable about a portion of the second fastening axis that is laterally offset from the longitudinal axis opposite the first fastening axis, wherein each fastener includes an engagement section for securing the respective fastener to a mechanical interface of the aircraft, each engagement section being radially outward of the respective fastening axis, and wherein each fastener is rotatable from an open position, where the respective engagement section is engageable with the mechanical interface of the aircraft, to a closed position that reduces a drag coefficient of the fastening system compared to the open position.

Each fastener may include a leg for distributing load when the respective fastener is in the open position.

The housing may include a longitudinally-extending support with a leg-bearing surface for distributing load received from each leg when the respective fastener is open.

The bearing surface may include an adjustable-leg-bearing surface for adjusting the open position of the first fastener or the second fastener.

The housing may include a closed-position adjuster for adjusting the closed position of the first fastener or the second fastener.

The fasteners may rotate about a load-bearing pin that is radially fixed to the housing.

When the fasteners are in the open position the fasteners may be positively locked open, or when the fasteners are in the closed position the fasteners may be positively locked closed.

The fastening system may include an actuator assembly operably connected to each fastener.

The actuator assembly may include a pneumatic actuator operably connected to at least one of the fasteners.

An expendable aircraft store may include the fastening system. Rotating each fastener from the open position to the closed position may reduce a drag coefficient of the expendable vehicle store compared to the open position.

The expendable aircraft store may be a missile.

An aircraft may include a mechanical interface connected to the fasteners of the fastening system of the expendable aircraft store.

An aircraft may include the expendable aircraft store. The fastening system may include an actuator assembly operably connected to each fastener to positively lock the fasteners in the open position, to close the fasteners, to open the fasteners, or to positively lock the fasteners in the closed position, wherein the actuator assembly includes a pneumatic actuator, wherein the housing includes a closed-position adjuster for adjusting the closed position of the first fastener or the second fastener, wherein the fasteners rotate about a load bearing pin that is radially fixed to the housing, wherein when the fasteners are in the open position the fasteners are positively locked open, or when the fasteners are in the closed position the fasteners are positively locked closed.

The fasteners may be configured to secure to a mechanical interface that is in conformance with STANAG 3842.

According to another aspect of the invention, a method of operating a fastening system for securing an expendable aircraft store to an aircraft, may include providing a housing that forms part of the expendable aircraft store, the housing extending along a longitudinal axis, rotating a first fastener about a first fastening axis, wherein the first fastener is rotatably connected to the housing, and rotating a second fastener about a second fastening axis that is laterally offset from the first fastening axis relative to the longitudinal axis, wherein the first fastener is rotatably connected to the housing, wherein each fastener includes an engagement section for securing the respective fastener to a mechanical interface of the aircraft, each engagement section being radially outward of the respective fastening axis, and wherein each fastener is rotatable from an open position, where the respective engagement section is engageable with a mechanical interface of the aircraft, to a closed position that reduces a drag coefficient of the fastening system compared to the open position.

The method may include rotating each fastener from the open position to the closed position, thereby reducing the drag coefficient of the fastening system.

The method may include actuating an actuator assembly that is operably connected to each fastener to positively lock the fasteners in the open position, to close the fasteners, to open the fasteners, or to positively lock the fasteners in the closed position.

The method may include launching the expendable aircraft store, and rotating the fasteners of the launched expendable aircraft store to the closed position, thereby reducing the drag coefficient of the expendable aircraft store.

The method may include adjusting a bearing surface of the housing to adjust the open position of the first fastener or the second fastener, wherein a vertical distance of the bearing surface from the first fastening axis or the second fastening axis is adjusted.

The method may include adjusting a closed-position adjuster of the housing to adjust the closed position of the first fastener or the second fastener.

The foregoing and other features of the invention are hereinafter described in greater detail with reference to the accompanying drawings.

DETAILED DESCRIPTION

The principles of this present application have particular application to fastening expendable aircraft stores to an aircraft until launch from the aircraft, such as launching a missile from an airplane, and thus will be described below chiefly in this context. It will be appreciated that principles of this invention may be applicable to other stores where it is desirable to reduce a drag coefficient of the store upon detachment of the other store from a vehicle.

Figure 1:
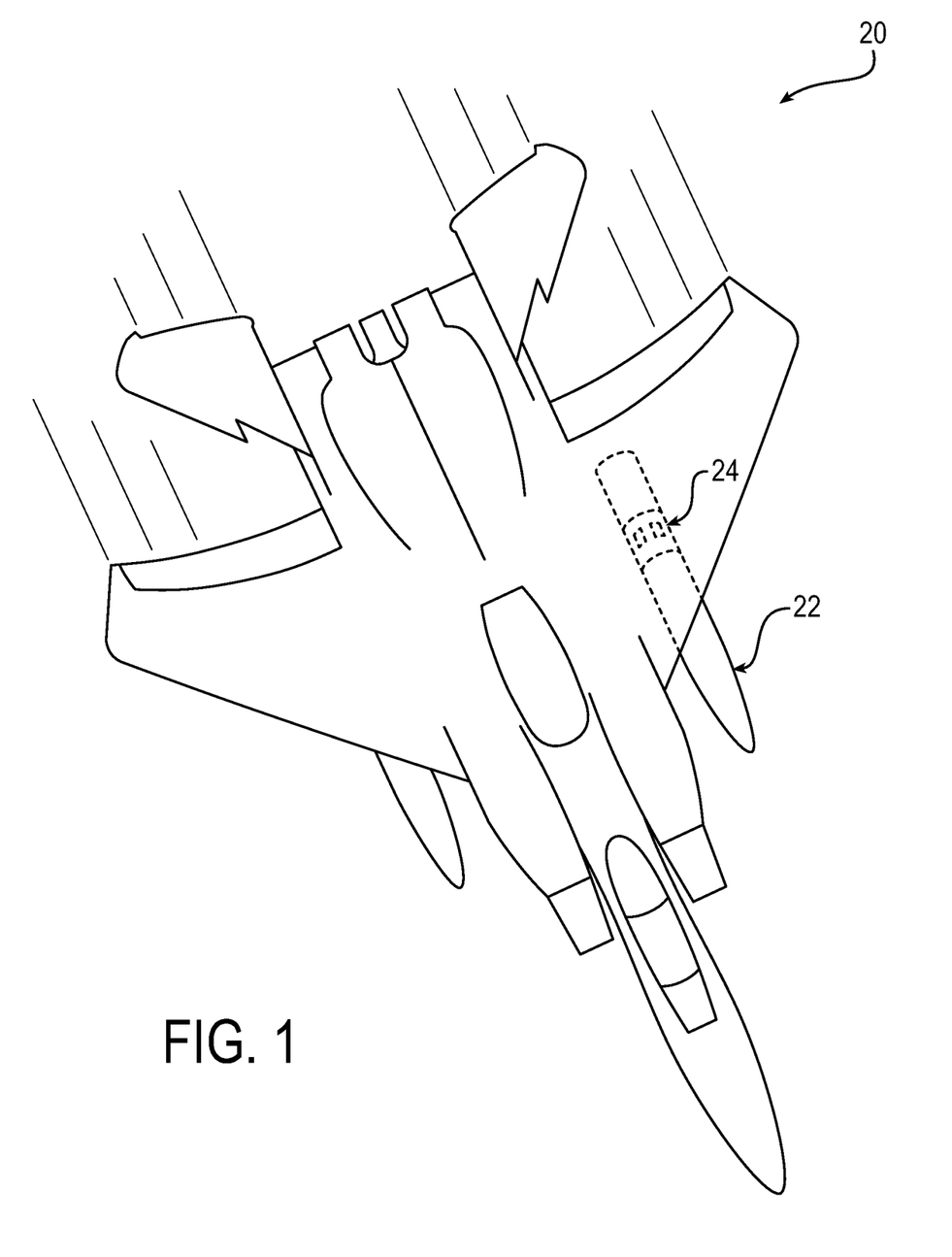
FIG. 1 is an oblique view of an exemplary aircraft with an exemplary expendable aircraft store including an exemplary fastening system.

Referring now to the drawings and initially to FIG. 1, an exemplary aircraft is designated generally by reference numeral 20. The aircraft 20 can be provided with an expendable aircraft store detachably attached to a portion of the aircraft 20. For example, the expendable aircraft store may be a missile 22 or an unmanned aerial vehicle ("drone") (not shown). Each missile 22 may be detachably attached to a wing of the aircraft 20 to be deployable while the aircraft is airborne. Each missile 22 may include an exemplary fastening system 24 for detachably attaching the missile 22 from the wing of the aircraft 20.

Figure 2:
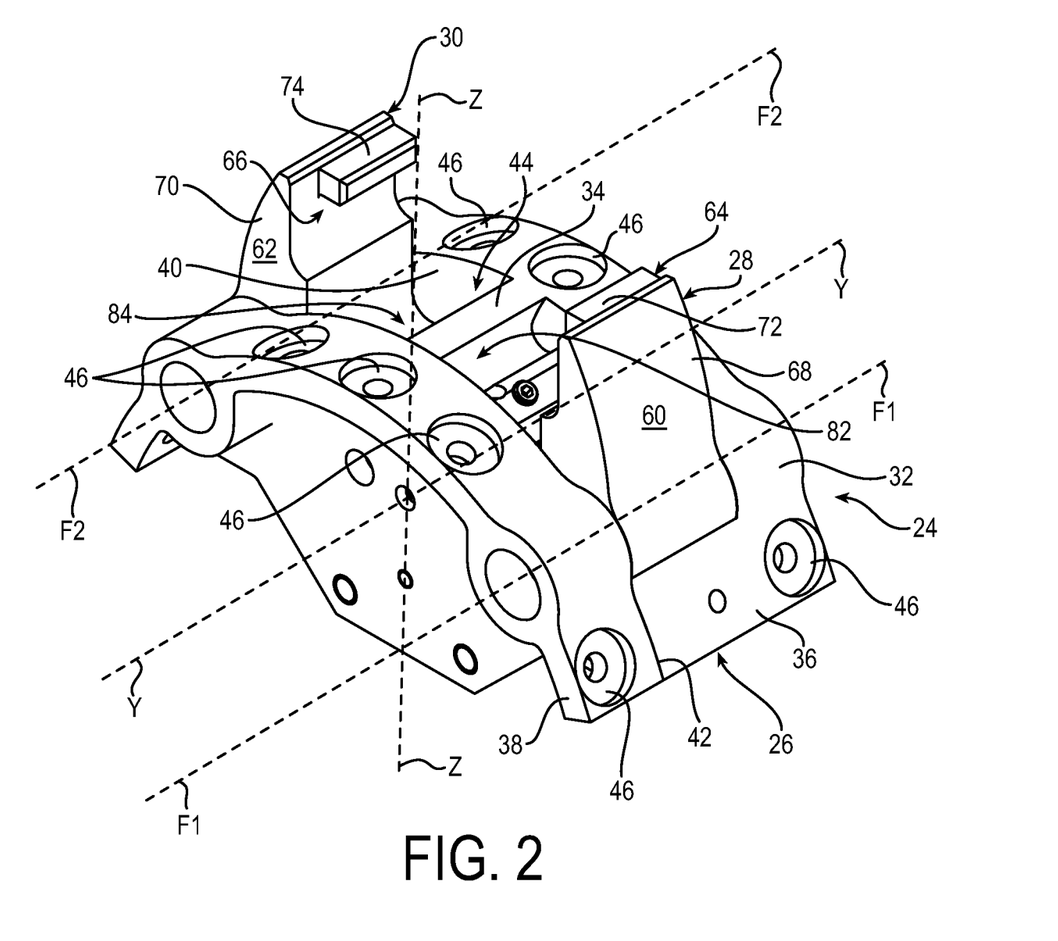
FIG. 2 is an oblique view of the fastening system of FIG. 1 in a locked-open state and including fasteners in an open position.

FIG. 2 illustrates one of the fastening systems 24 in a locked-open state. The fastening system 24 may include a housing 26, which may extend along a longitudinal axis Y, and may include fasteners 28 and 30 (e.g., hooks) that are rotatably connected to the housing 26. The housing 26 and the fasteners 28 and 30 may have reflectional symmetry across a YZ-plane defined by the longitudinal axis Y and a vertical axis Z.

The housing 26 may include a main body 32, a longitudinally-extending support 34, a longitudinally-extending flange 36, and a cover 38 longitudinally opposite the main body 32. The longitudinally-extending support 34 and the longitudinally-extending flange 36 may connect to a longitudinally-inner surface 40 of the main body 32 and a longitudinally-inner surface 42 of the cover 38 to define an inner cavity 44 to allow rotation of the fasteners 28 and 30.

The longitudinally-extending support 34, the main body 32, and the cover 38 may define the inner cavity 44.

The inner cavity 44 may have a longitudinal length at least equal to or greater than a longitudinal length of each fastener 28 or 30 to allow the fasteners 28 or 30 to rotate without interference by the longitudinally-inner facing surfaces 40 and 42 of the main body 32 and the cover 38, respectively.

The longitudinally-extending support 34 and the main body 32 may be one-piece to form a portion of the housing 26. In an embodiment, the longitudinally-extending support and the cover may be one-piece to form a portion of the housing.

The housing 26 of the fastening system 24 may be integrated as part of the missile 22 (shown in FIG. 1) in any suitable manner. For example, the housing 26 may form part of a housing of the missile 22. Counter-bored holes 46 may receive securing members, such as bolts (not shown), to fix the fastening system 24 to a support structure (not shown) or skin of the missile 22. Alternatively, the housing may be fixed to the housing of the missile 22 with another method of fixing, such as bolting, welding, and/or clamping.

The fasteners 28 and 30 are illustrated in an open position. The fasteners 28 and 30 may each include a body 60 or 62 with an engagement section 64 or 66 for securing the missile 22 to the aircraft 20. The engagement section 64 or 66 may be disposed at a radially outward end of a radially-extending portion 68 or 70 of the corresponding body 60 or 62.

Figure 6:
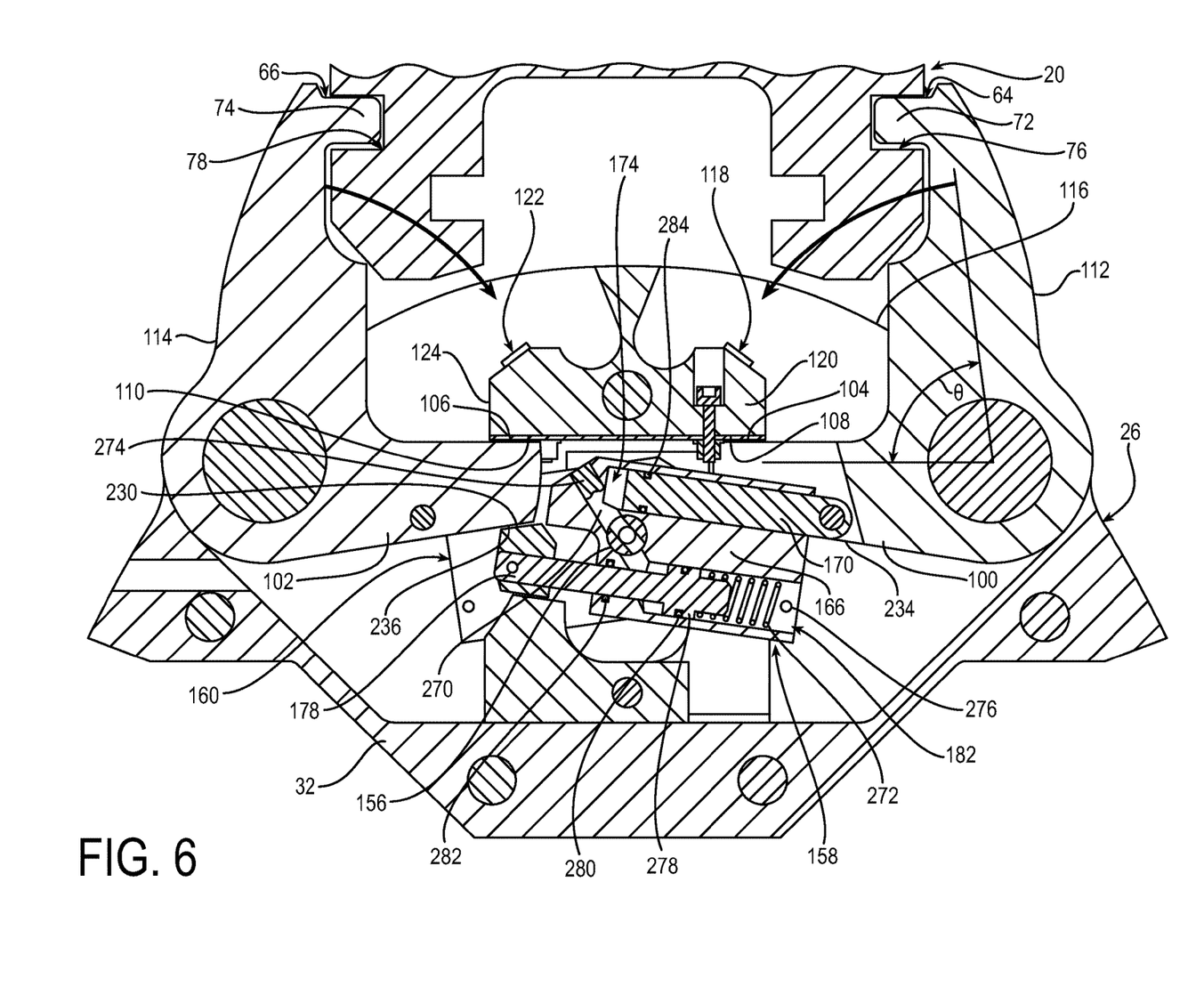
FIG. 6 is a cross-sectional view taken along line 6-6 of the fastening system of FIG. 3 and a mechanical interface of the aircraft of FIG. 1.

The engagement section 64 or 66 may include a protrusion 72 or 74 for engaging a concave surface 76 or 78 (shown in FIG. 6) of a mechanical interface 80 of the aircraft 20 when the fastener is open. The concave surface 76 or 78 may be longitudinally and vertically aligned with the corresponding protrusion 72 or 74 to receive the corresponding protrusion 72 or 74 (as shown in FIG. 6).

The engagement section 64 or 66 may engage the longitudinally-extending support 34 when the corresponding fastener 28 or 30 is closed. For example, each lateral side of the longitudinally-extending support 34 may include a recess—defined by a concave surface 82 or 84 of the longitudinal extending support 34—for receiving the corresponding fastener 28 or 30 when the fastener 28 or 30 rotates to the closed position. The engagement section 64 or 66 of the fastener 28 or 30 may have a longitudinal length equal to or less than the longitudinal length of the concave surface 82 or 84 and may be longitudinally aligned with the concave surface 82 or 84 to allow the recess to receive the protrusion 72 or 74 of the engagement section 64 or 66.

For example, the concave surface 82 or 84 may be radially spaced from the corresponding fastening axis F1 or F2 a distance that is equal to the distance the engagement section 64 or 66 is radially spaced from the corresponding fastening axis F1 or F2. In an embodiment, the engagement section of the fastener includes a recess for receiving a protrusion of the aircraft and/or a protrusion of the longitudinally-extending support. The recess of the fastener may be radially spaced from the corresponding fastener axis F1 or F2 a distance that is equal to the distance that the corresponding protrusion is radially spaced from the fastener axis F1 or F2.

Figure 3:
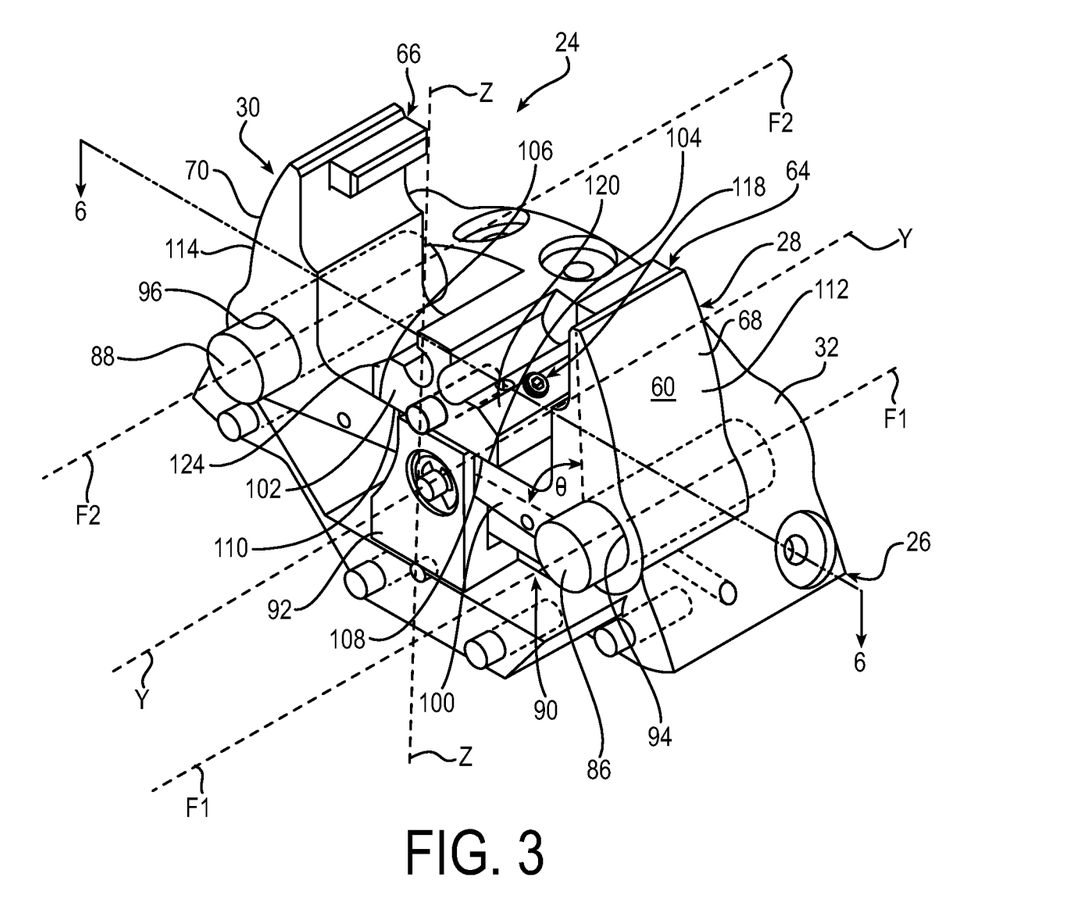
FIG. 3 is an oblique view of the fastening system of FIG. 2 with a cover removed to illustrate internal components of the fastening system in the locked-open state.

Turning now to FIG. 3, the fastening system 24 may include fastener pins 86 and 88 to rotatably attach each fastener 28 or 30 to the housing 26, and an actuator assembly 90 that may be axially fixed to the housing 26 by a pair of center blocks 92 that may be axially and rotatably fixed to the housing 26.

The body 60 or 62 of the fasteners 28 and 30 may include a through hole 94 or 96 for receiving each corresponding fastener pin 86 or 88. The through hole 94 may define the first fastening axis F1 and the through hole 96 may define the second fastening axis F2. The first fastening axis F1 may be laterally offset from the longitudinal axis Y and parallel with the longitudinal axis Y. The distance of the lateral offset may be equal to or greater than a distance that the engagement section 64 is radially offset from the first fastening axis F1.

The second fastening axis F2 may be laterally offset from the longitudinal axis Y, opposite the first fastening axis F1, and parallel with the longitudinal axis Y. The distance of the lateral offset may be equal to or greater than a distance that the engagement section 66 is radially offset from the second fastening axis F2.

The fastener pins 86 and 88 may be load bearing and extend concentrically with the corresponding fastening axis F1 or F2 from the main body 32 to the cover 38 (shown in FIG. 1) to allow the fasteners 28 and 30 to rotate and to radially fix the fasteners 28 and 30 to the housing 26. For example, the fastener pin 86 may allow the fastener 28 to rotate about a portion of the first fastening axis F1 and the fastener pin 88 may allow the fastener to rotate about a portion of the second fastening axis F2.

The body 60 or 62 of the fasteners 28 or 30 may be L-shaped to distribute load from the radially-extending portion 68 or 70 and to limit the open position of the fasteners 28 or 30. The body 60 or 62 may include a leg 100 or 102 with a support-bearing surface 104 or 106 to form the L-shape. For example, the leg 100 or 102 may extend radially outward from a pivot portion of the body 60 or 62 to form an oblique angle θ with the radially-extending portion 68 or 70 (shown more clearly in FIG. 6). The angle θ may be anywhere from 60° to 90°. In an embodiment angle θ is anywhere from 60° to 130°, anywhere from 75° to 110°.

The L-shaped body allows the fastener 28 and 30 to distribute a portion of the stress from the radially-extending portion 68 or 70 to the support-bearing surface 104 or 106 of the leg 100 or 102 when the corresponding fastener 28 or 30 is in the open position. The support-bearing surface 104 or 106 of the leg 100 or 102 may transfer a portion of the stress to a leg-bearing surface 108 or 110 of the longitudinally-extending support 34, which may transfer a portion of the stress to the housing 26. Transferring stress through the support-bearing surface 104 or 106 may reduce stress experienced by the corresponding fastener pin 86 or 88.

The support-bearing surface 104 or 106 and the leg-bearing surface 108 or 110 may limit the amount the corresponding fastener 28 or 30 can rotate from the open position to the closed position. Engaging the support-bearing surface 104 or 106 with the leg-bearing surface 108 or 110 may prevent further opening rotation of the corresponding fastener.

An outer surface 112 or 114 of the corresponding radially-extending portion 68 or 70 may have a profile that matches adjacent portions of the housing 26 or a skin (shown schematically in FIG. 1) of the missile 22. The outer surface 112 or 114 may be any suitable shape to reduce the drag coefficient of the fastening system 24 and/or the missile 22.

Figure 10:
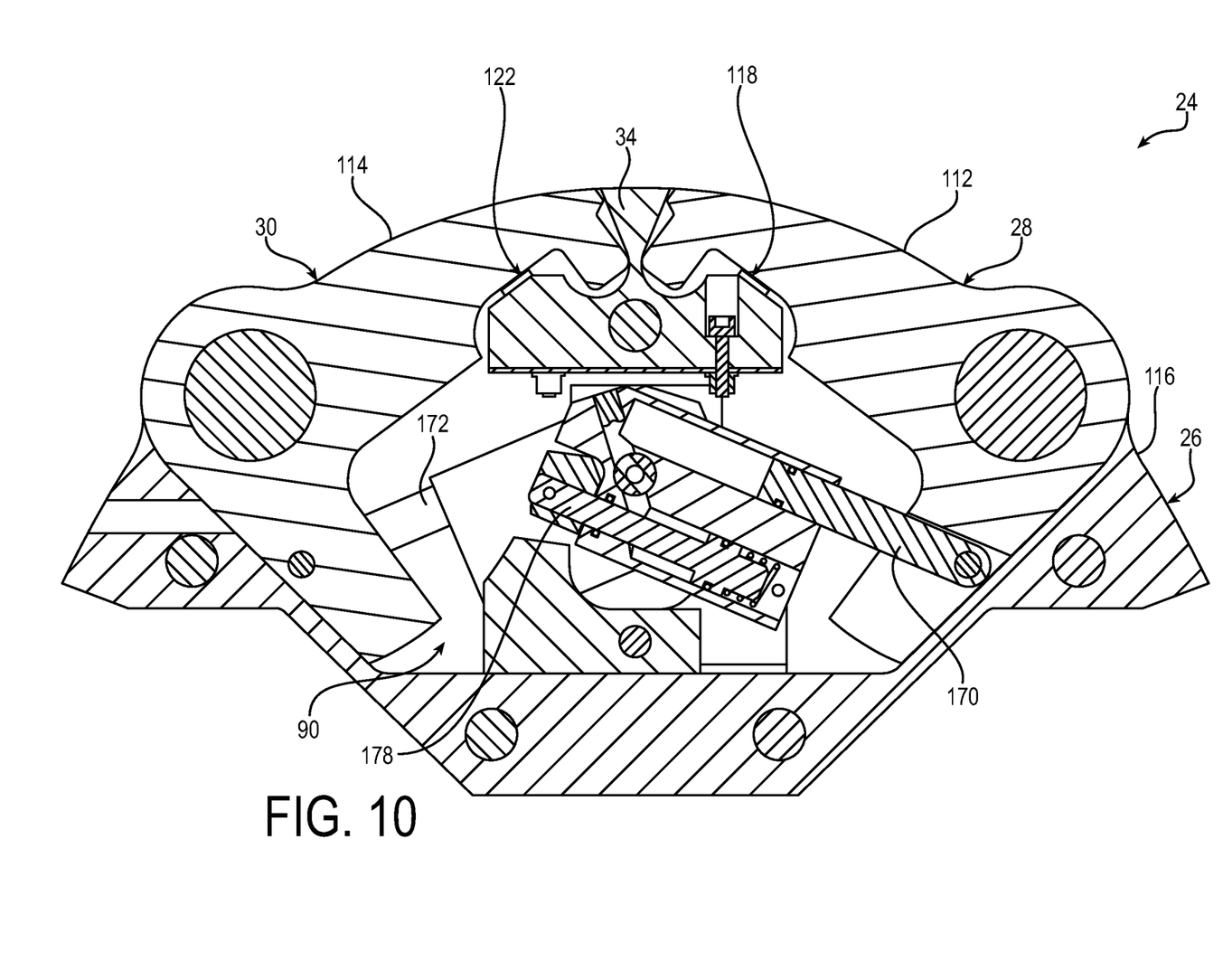
FIG. 10 is cross-sectional view of the fastening system of FIG. 6 in a locked-closed state.

Referring briefly to FIG. 6, when the fastener 28 or 30 is closed the outer surface 112 or 114 may be contiguous with a radially-outward-facing surface 116 of the housing 26 or a radially-outward-facing surface of the skin of the missile 22. The outer surface 112 or 114 may have a profile that is contiguous with the radially-outward-facing surface 116 of the housing 26 or the skin along an XZ-plane. The outer surface 112 or 114 may have a profile that is contiguous with the housing 26 or the skin along the longitudinal axis Y, as illustrated in FIG. 10.

Turning back to FIG. 3, the actuator assembly 90 may be operably coupled to both fasteners 28 or 30 to open, to close, to positively lock open, and/or to positively lock closed the fasteners 28 or 30, as discussed in more detail below in the discussion of FIG. 4.

The housing 26 may include a closed-position adjuster 118 for adjusting the closed position of the fastener 28. The closed-position adjuster may be disposed within a laterally-extending portion 120—of the longitudinally-extending support 34—that receives the radially-extending portion 68 of the fastener 28. For example, the closed-position adjuster 118 may include a threaded hole in the laterally-extending portion 120 and a set screw that engages with the threaded hole. Rotation of the set screw while engaged with the threaded hole may adjust a distance that the set screw protrudes from the portion of the longitudinally-extending support 34 to adjust the amount the radially-extending portion 68 may rotate to reach the closed position.

Adjusting the rotation of the radially-extending portion 68 may adjust the drag coefficient of the fastening system 24 by adjusting the position of the outer surface 112 of the radially-extending portion 68 when the fastener 28 is closed, as discussed in more detail below in the discussion of FIG. 10.

A closed-position adjuster 122 (shown in FIG. 6) may be disposed within a laterally-extending portion 124 of the longitudinally-extending support 34 for adjusting the closed position of the second fastener 30. The closed-position adjuster 122 may be the same as the above described closed-position adjuster 118, except mirrored across the XY-plane.

Figure 4:
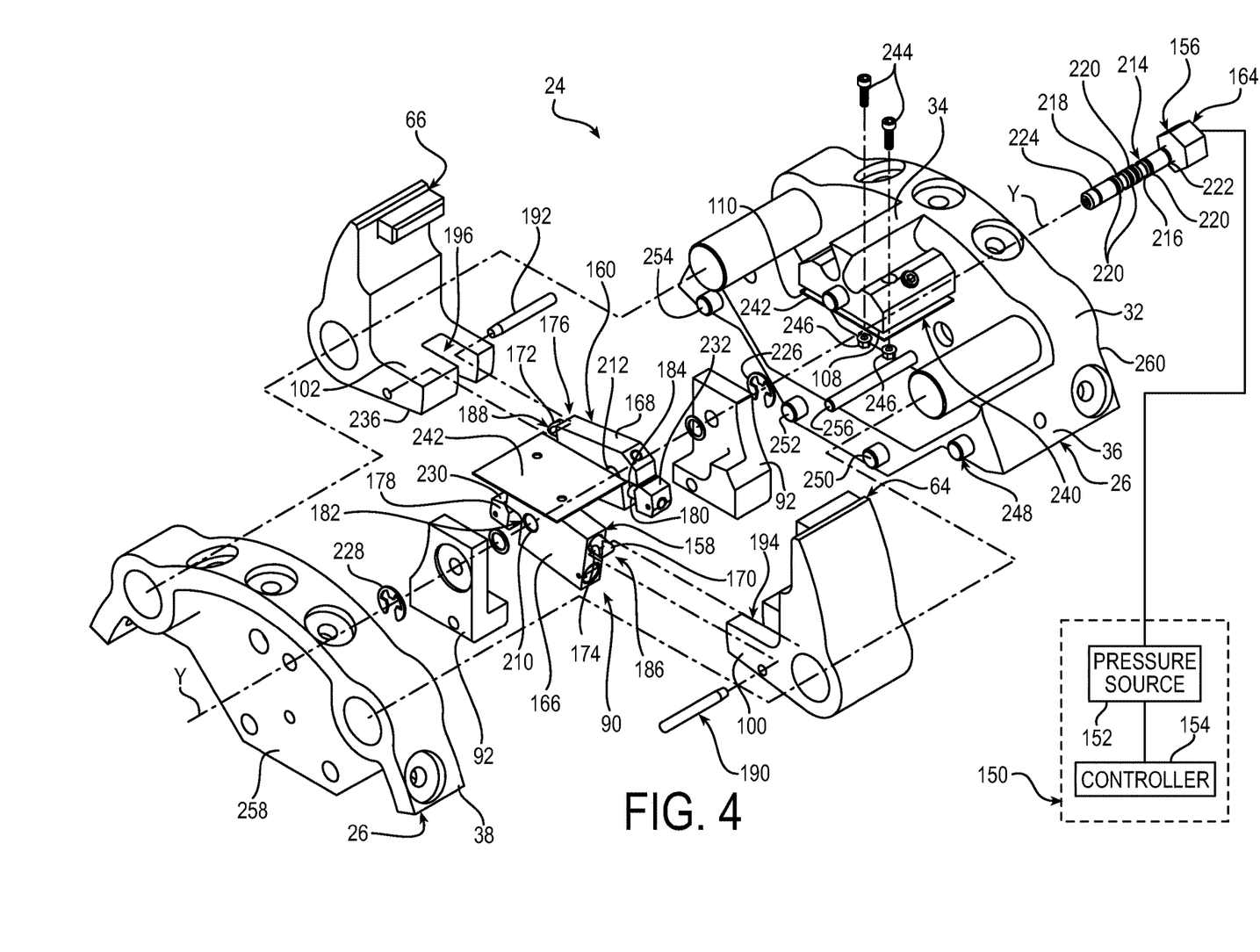
FIG. 4 is an exploded perspective view of the fastening system of FIG. 2.

Turning to FIG. 4, the fastening system 24 may include a control system 150 operably coupled to the actuator assembly 90 to lock and actuate the fasteners 28 and 30. The control system 150 may include a pressure source 152 that is operably coupled to a controller 154 for controlling the actuator assembly 90 via the pressure source 152 and an actuator pivot 156.

The controller 154 may be configured to operate the pressure source 152 to pneumatically actuate the actuator assembly 90. For example, the controller 154 may be any suitable computer or electronic processor that is able to control or instruct the pressure source 152.

The pressure source 152 may be any suitable device able to provide fluid pressure to the actuator pivot 156. For example, the pressure source may be a pressurized air reservoir. In an embodiment, the pressure source is another source of mechanical force, such as an electromechanical actuator, or another suitable device operably coupled to the actuator assembly.

The actuator assembly 90 may include the actuator pivot 156, a pair of double actuators 158 and 160 that are each operably connected to both fasteners 28 and 30 and rotatable about the actuator pivot 156. The actuator pivot 156 may have a fluid passage 162 (partially shown in FIG. 5) at an end 164 operably coupled to the pressure source 152.

Each double actuator 158 or 160 may include a body 166 or 168, a closing piston 170 or 172 axially movable within a blind hole 174 or 176 in the body 166 or 168, and a locking piston 178 or 180 axially moveable within a locking-piston through hole 182 or 184 in the body 166 or 168.

The closing piston 170 or 172 may have an end 186 or 188 that is operably coupled to the corresponding fastener 28 or 30. Each end 186 or 188 may be rotatably coupled to the opposite fastener 28 or 30 that the corresponding locking piston 178 or 180 engages. The end 186 or 188 may be rotatably coupled at a position that creates a rotational moment about the corresponding fastening axis F1 or F2 when the closing piston 170 or 172 extends from the body 166 or 168.

For example, a pin 190 or 192 may extend parallel to the corresponding fastening axis F1 or F2 through each lateral recess 194 or 196 and through each end 186 or 188 to rotatably couple the ends 186 and 188 to the fasteners 28 or 30 at location vertically opposite the engagement section 64 or 66 relative to the corresponding fastening axis F1 or F2.

Each end 186 or 188 may be disposed within the lateral recess 194 or 196 of the fastener 28 or 30 to provide space for the fastener 28 or 30 to rotate without interference from the closing piston 170 or 172. Each lateral recess 194 or 196 may be longitudinally offset from one another based on a longitudinal width of each double actuator 158 or 160 and the distance each double actuator 158 or 160 is longitudinally spaced from the other.

Each body 166 or 168 of the double actuators 158 or 160 may include a through hole 210 or 212 that is concentric with the longitudinal axis Y for receiving the actuator pivot 156. Each body 166 or 168 may be rotatably connected to the actuator pivot 156 (as shown in detail in FIGS. 6-10).

The actuator pivot 156 may include a longitudinally-extending nipple 214 for fluidly connecting each body 166 or 168 to the pressure source 152. The longitudinally-extending nipple 214 may include a portion of the fluid passage 162 (shown in FIG. 5) that is fluidly connected to the pressure source and may have a sealed longitudinal end to prevent fluid flow longitudinally through the entire nipple 214. For example, the fluid passage 162 may extend longitudinally from the longitudinal end 164 that may be operably connectable to the pressure source 152—to a first radial-through-hole 216—that is longitudinally offset from the longitudinal end 164—for providing pressurized fluid to the blind hole 176 and the locking-piston through hole 184 within the body 168. The fluid passage 162 may extend longitudinally from the first radial-through-hole 216 to a second radial-through-hole 218 that is longitudinally offset from the longitudinal end 164 and longitudinally beyond the first radial-through-hole 216 for engaging the blind hole 174 and the locking-piston through hole 182 within the body 166.

The actuator pivot 156 may seal either longitudinal side of each radial-through-hole 216 or 218 against a radially inward facing surface of each body that defines each through hole 210 or 212. For example, the actuator pivot 156 may include sealing members (not shown) circumscribing a portion of the longitudinally-extending nipple 214 on both longitudinal sides of each radial-through-hole 216 and 218. The sealing members (not shown) may be placed within each circumscribing groove 220 that is longitudinally spaced on either side of each radial-through-hole 216 and 218. The sealing members may be o-rings or any other suitable sealing member.

The longitudinally-extending nipple 214 may be longitudinally aligned with and longitudinally fixed to each body 166 or 168 of the actuator assembly 90. For example, the longitudinally-extending nipple 214 may include a retaining-ring groove 222 or 224 proximate each end of the longitudinally-extending nipple 214, as shown more clearly in FIG. 5. Each retaining ring 226 or 228 may engage a longitudinally-facing surface of each center block 92 to limit longitudinal movement of the longitudinally-extending nipple 214 in a first-longitudinal direction and/or a second-longitudinal direction opposite the first-longitudinal direction.

Figure 5:
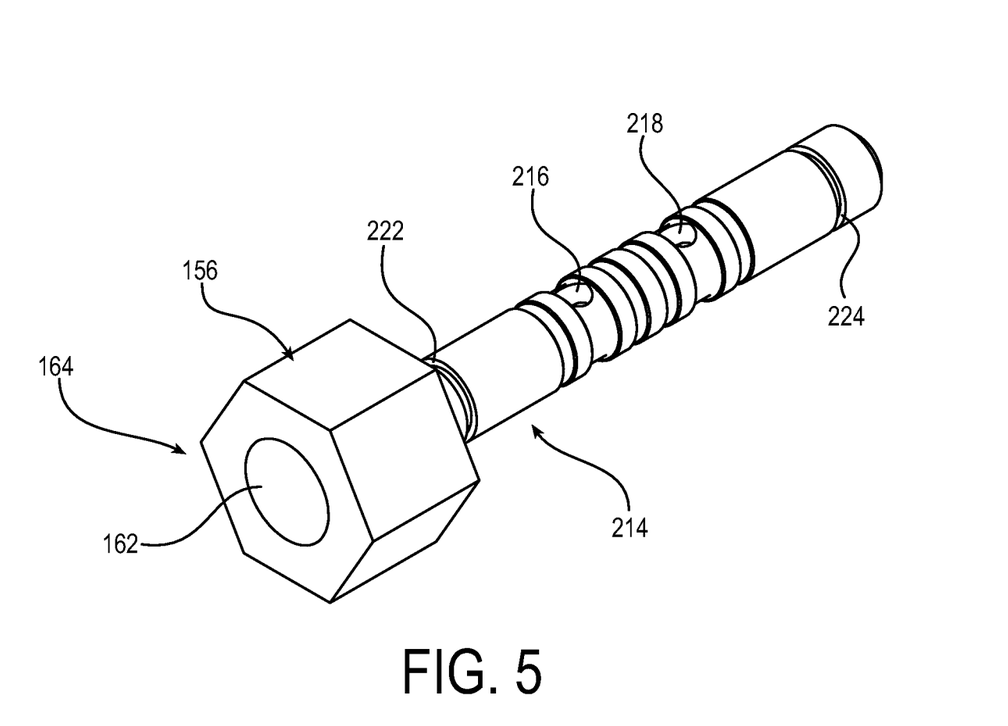
FIG. 5 is an oblique view of a valve member of the fastening system of FIG. 4.

Limiting the longitudinal movement allows the longitudinally-extending nipple 214 to longitudinally align each radial-through-hole 216 or 218 with the corresponding body 166 or 168 to provide pressurized fluid to each body 166 or 168.

The actuator pivot 156 may provide pressurized fluid, such as air, to each body 166 or 168 to retract the locking piston 178 or 180 and to extend the closing piston 172 or 174, as discussed in more detail below in the discussion of FIG. 6. Alternatively, the actuator pivot 156 may remove pressurized fluid from each body 166 or 168 to retract the closing piston 172 or 174 (e.g., to open the corresponding fastener) and to extend the locking piston 178 or 180.

Each locking piston 178 or 180 may include a moveable end with a leg-locking-surface 230 or 232 for engaging a lock-bearing surface 234 or 236 (shown more clearly in FIG. 6) of the corresponding leg 100 or 102 to prevent inward rotation of the corresponding fastener 28 or 30. For example, the leg-locking surface 230 or 232 may engage the lock-bearing surface 234 or 236 when the fastener 28 or 30 is open and the lock-bearing surface 234 or 236 faces in a direction opposite the leg-bearing surface 230 or 232. Fixing the locking piston 178 or 180 in the extended position while the leg-locking surface 230 or 232 engages the lock-bearing surface 234 or 236 may prevent inward rotation of the fastener 28 or 30 about the respective fastening axis F1 or F2 to lock each fastener 28 or 30 in the open position.

The longitudinally-extending support 34 may include an adjustable-leg-bearing surface 240 for adjusting the open position of the fastener 28 or 30 and/or for distributing load received from each leg 100 or 102 when the fastener 28 or 30 is open. For example, a shim plate 242 may form the leg-bearing surface 108 or 110. The shim plate 242 may be fixed to the longitudinally-extending support 34 to engage the legs 100 and 102. The shim plate 242 may have any suitable vertical depth for attaining the desired open position of the fastener 28 or 30, or the shim plate 242 may include multiple shim plates 242 of varying vertical depths to adjust the open position of the fastener 28 or 30.

The shim plate 242 may be fixed by securing members, such as bolts 244 that extend through vertical holes in the longitudinally-extending support 34 and the shim plate 34 and nuts 246 that fix the bolts 244 to the longitudinally-extending support 34.

When the fastener 28 or 30 is in the open position, the leg-bearing surface 108 or 110 may distribute load received from each leg 100 or 102 to the housing 26. For example, the leg-bearing surface 108 or 110 may be fixed to the main body 32 and the cover 38 of the housing 26. The longitudinally-extending support 34 and the main body 32 may be one-piece, except for the shim 242.

The cover 38 may be vertically and laterally fixed to the longitudinally-extending support 34 by a plurality of pins 248, 250, 252, 254, and 256 that are vertically and laterally fixed to the main body 32. The plurality of pins 248-256 may extend longitudinally beyond the longitudinally-extending flange 36 of the main body 32 to engage with longitudinally extending holes in the cover 38.

The cover 38 may be longitudinally fixed to the main body 32 by any suitable device. For example, a longitudinally fixed surface may abut a longitudinally outward facing surface 258 of the cover 38 and a longitudinally outward facing surface 260 of the main body 32, as illustrated schematically in FIG. 1. In an embodiment, the cover and the main body are each fixed to a support structure of the missile. In another embodiment, the cover and the main body are bolted together and/or clamped together.

The pin 256 may be a center-block pin that may extend longitudinally through the center blocks 92 to the cover 38 to rotatably fix the center blocks 92 to the housing 26.

Turning to FIGS. 6-10, the body 166 of the double actuator 158 may include a fluid passage 270 and a resilient member 272 biasing the locking piston 178. The fluid passage 270 may fluidly connect the blind hole 174 and the locking-piston through hole 182 to the through hole 210. For example, the fluid passage 270 may be a blind hole that extends radially through a portion of the blind hole 174 and through a portion of the locking-piston through hole 182.

A sealing member 274 may prevent fluid within the blind hole 174 or the locking-piston through hole 182 from flowing out of the fluid passage 270. The sealing member 274 may be a set screw that is threadably coupled to the body 166 to prevent fluidly flow out of the fluid passage 270.

The resilient member 272 may bias the locking piston 178 to laterally toward the fastener 30 to engage the leg-locking surface 230 with the lock-bearing surface 236 of the fastener 30. The resilient member 272 may abut a longitudinally-extending pin 276 and a radially-outward protrusion 278 of the locking piston to laterally bias the leg-locking surface 230 toward the lock-bearing surface 236.

The resilient member 272 may be any suitable biasing device, such as a spring in a compressed state that abuts the longitudinally extending pin 276 and the radially-outward protrusion 278.

The longitudinally-extending pin 276 may be fixed to the body 166. For example, the longitudinally-extending pin 276 may be press-fit into a through hole of the body 166 at an end of the through hole 182 that is opposite the leg-locking surface 230.

The locking piston 178 may be sealingly connected to the body 166. For example, the radially-outward protrusion 278 may include a sealing member 280, such as an o-ring, for sealing against a radially-inner-facing surface of the body 166 that defines a portion of the through-hole 182 to prevent fluid flow between the radially-outward protrusion 278 and the body 166. The body 166 may include a sealing member 282, such as an o-ring, for sealing against a radially-outer-facing surface the locking piston 178 disposed between the radially-outward protrusion 278 and the leg-locking surface 230.

The closing piston 170 may be sealingly connected to the body 166. For example, the closing piston 170 may include a sealing member 284, such as an o-ring, for sealing against a radially-inner-facing surface of the body 166 that defines a portion of the blind hole 174.

The double actuator 160 may be the same as the double actuator 158 and oriented in reverse to unlock the fastener 28 and to rotate the fastener 30 when the fasteners 28 and 30 are disconnected from the mechanical interface 80, which may be referred to below as a store fastener 80 below.

When the fasteners 28 and 30 are in the open position, the store fastener 80 may be coupled to the fasteners 28 and 30. The store fastener 80 and the fasteners 28 and 30 may conform to a mechanical interface standard, such as STANAG 3842. For example, the protrusions 72 and 74 of the engagement sections 64 and 66 may engage with the laterally-opposite-facing concave surface 76 and 78 of the store fastener 80. In an embodiment, the engagement sections engage with protrusions of the store fastener.

The fasteners 28 and 30 may remain attached to the store fastener 80 during take-off, flight, and/or landing of the aircraft 20, until the missile 22 is launched. While the aircraft 20 operates, the fasteners 28 and 30 may experience thousands of pounds of load, such as when the aircraft 20 suddenly changes direction or accelerates in speed. The support-bearing surface 104 or 106 of the leg 100 or 102 may transfer a portion of the resulting stress that is perpendicular to the corresponding fastener axis F1 or F2 to the leg-bearing surface 108 or 110. The leg-bearing surface 108 or 110 may distribute a portion of the stress to the main body 32 and the cover 38 (shown in FIGS. 2 and 4).

The leg-bearing surface 108 or 110 may be adjusted, as mentioned above regarding FIG. 4, the adjustable-leg-bearing surface 240 may be adjusted to modify the vertical distance between the adjustable-leg-bearing surface 240 and the fastening axis F1 or F2. Modifying the vertical distance adjusts the open position of the fastener 28 or 30. For example, decreasing the vertical distance may restrict the open position, which may provide laterally tighter engagement between the fasteners 28 and 30 and the store fastener 80. Increasing the vertical distance may increase the open position, which may provide laterally looser engagement between the fasteners 28 and 30 and the store fastener 80.

The drag coefficient of the fastening system 24 may be highest when the fasteners are in the open position. The aerodynamic drag may be a function of speed of the missile 22, launch/release conditions such as speed and altitude, shape and size of the missile 22, and shape and size of other features such as strakes or fixed wings protruding from the missile 22. For example, the missile 22 (shown in FIG. 1) may have an aerodynamic drag when the fasteners 28 and 30 are open that is reduced by anywhere from 5%-25% when the fasteners 28 and 30 are closed.

Once the missile is launched, the controller 154 (shown in FIG. 4) may instruct the pressure source 152 (shown in FIG. 4) to provide pressurized fluid to the fluid passage 162 of the actuator pivot 156 to provide the pressurized fluid to each fluid passage 270 to pressurize the locking piston 178 and 180 and the closing piston 170 and 172. Once pressurized, the locking piston 178 and 180 may retract to unlock the corresponding fastener 28 or 30, thereby allowing the fastener 28 or 30 to rotate to reduce the drag coefficient.

Figure 7:
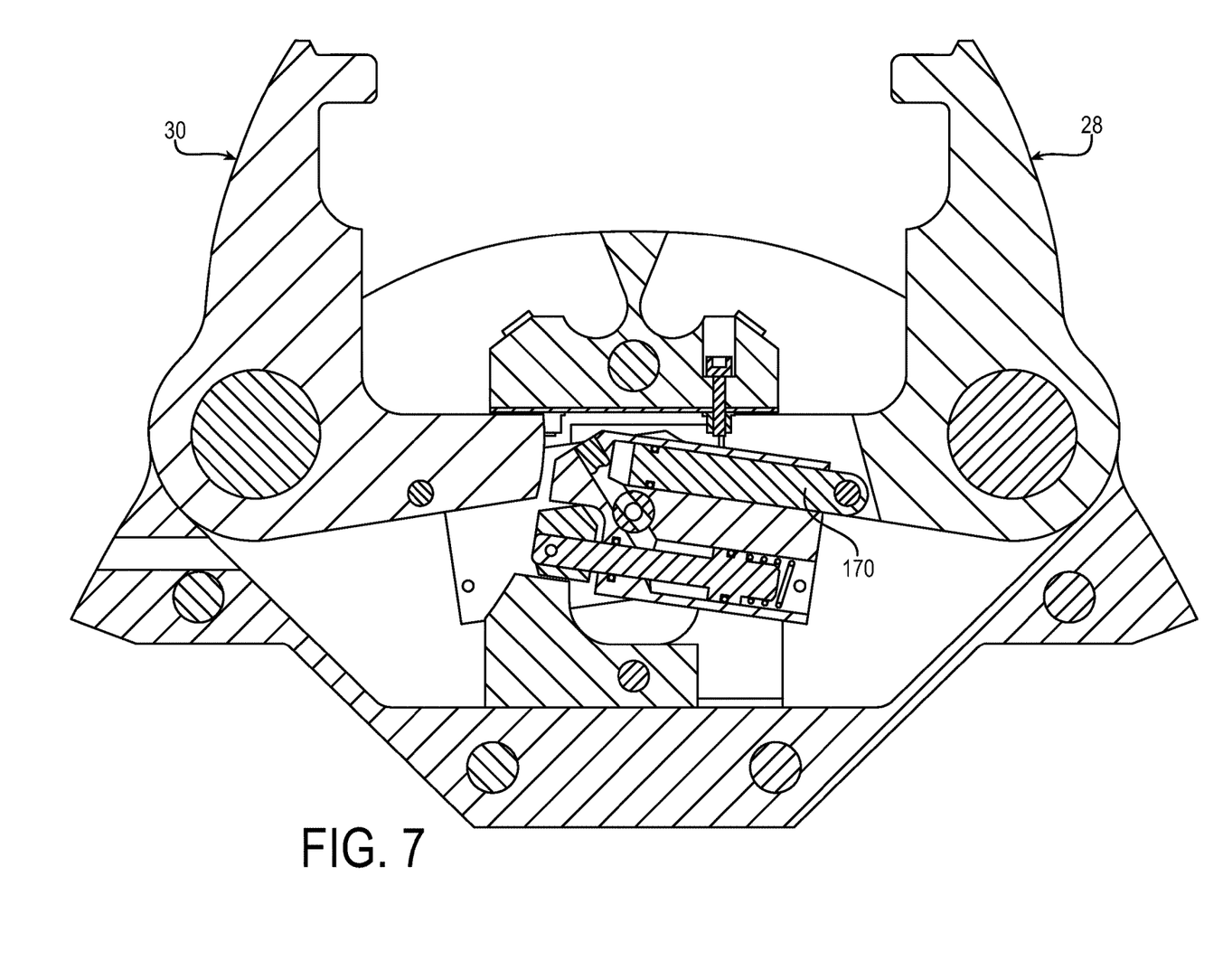
FIG. 7 is cross-sectional view of the fastening system of FIG. 6 in an unlocked-open state.

As shown in FIG. 7, once the fastener 28 or 30 is unlocked and free to rotate to the closed position, the corresponding closing piston 170 or 172 may extend to rotate the corresponding fastener 28 or 30 toward the closed position.

Figure 8:
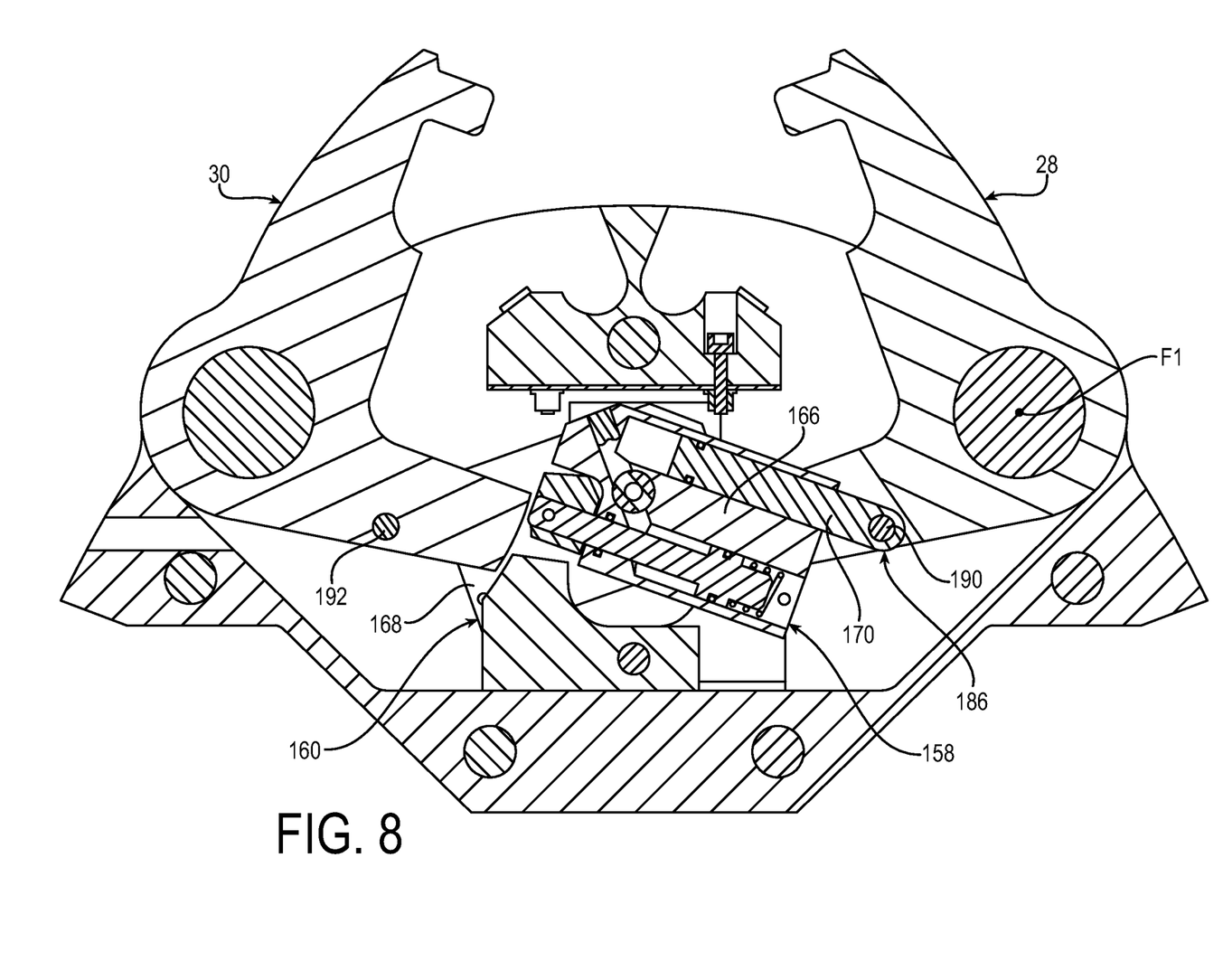
FIG. 8 is cross-sectional view of the fastening system of FIG. 6 in an unlocked-partially-open state.

As shown in FIG. 8, once the closing piston 170 begins to extend, the fastener 28 may begin to rotate inward about the corresponding fastener axis F1. As the closing piston 170 extends, the closing piston 170 rotates about the pin 190, which may rotate about the corresponding fastening axis F1. As the pin 190 rotates about the fastening axis F1, the corresponding body 166 of the double actuator 158 may rotate about the longitudinal axis Y to allow the end 186 of the closing piston 170 to follow the pin 190.

Operation of the double actuator 160 may be the same as the operation of the double actuator 158 to unlock the fastener 28 and/or to rotate the fastener 30. For example, each double actuator 28 and 30 may perform the same operations described above simultaneously.

Figure 9:
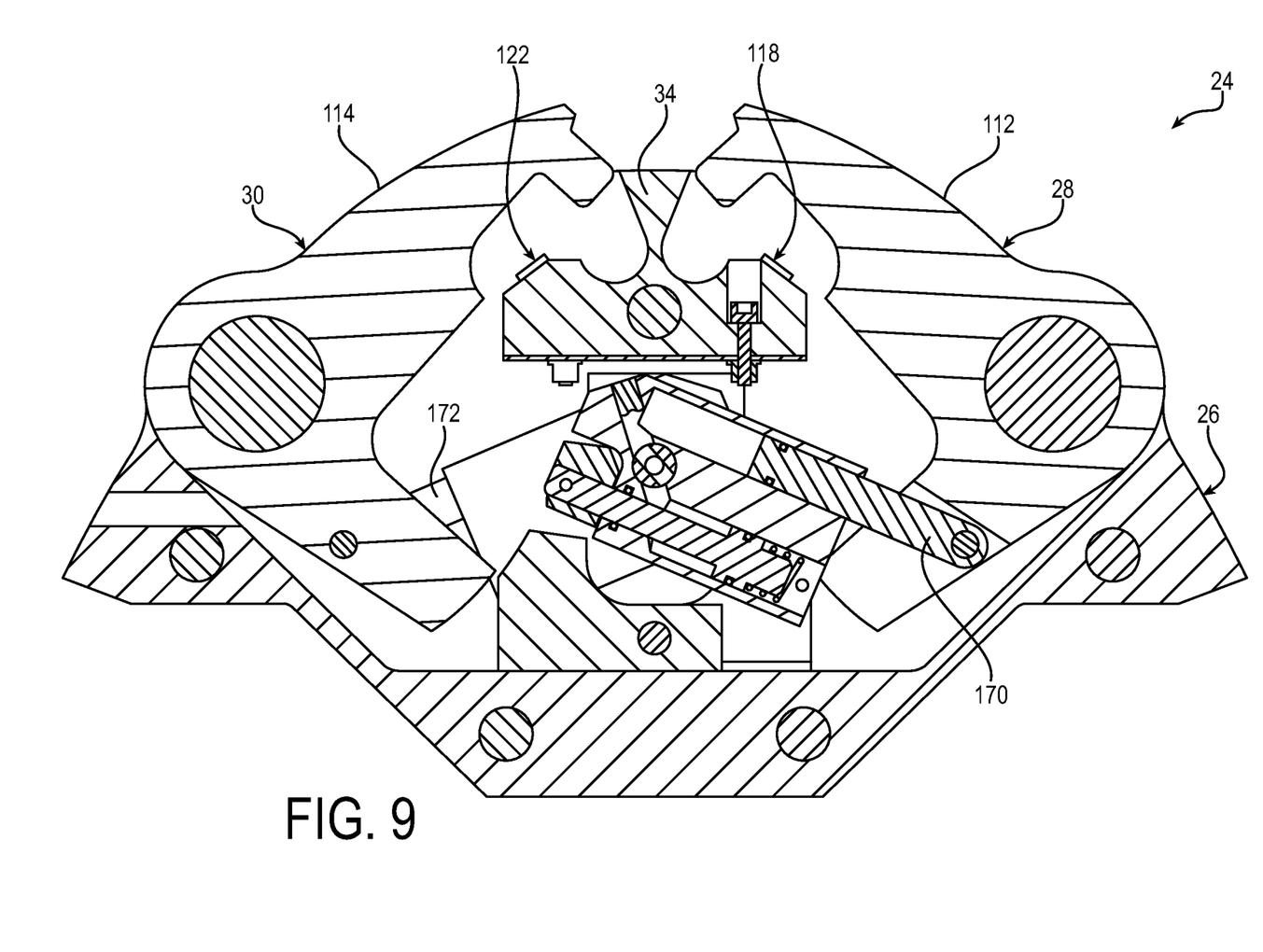
FIG. 9 is cross-sectional view of the fastening system of FIG. 6 in a further unlocked-partially-open state.

As shown in FIGS. 9 and 10, the closing piston 170 or 172 may continue to extend until the fastener 28 or 30 reaches the closed position. The fastener 28 or 30 may be in the closed position when the fastener 28 or 30 engages the longitudinally-extending support 34. For example, the fastener 28 or 30 may engage the closed-position adjuster 118 or 122, which may prevent further inward rotation of the fastener 28 or 30.

The closed-position adjuster 118 or 122 may be extended or retracted to modify the closed position of the corresponding fastener 28 or 30, as mentioned above regarding FIG. 3. Extending the closed-position adjuster 118 or 122 may restrict how much the fastener 28 or 30 can rotate inwardly to the closed position. Retracting the closed-position adjuster 118 or 122 may increase how much the fastener 28 or 30 can rotate inwardly to the closed position. If the outer surface 112 or 114 of the fastener 28 or 30 is protruding from and not contiguous with the housing 26 or the skin (shown schematically in FIG. 1), the closed-position adjuster 118 or 122 may be retracted until the corresponding outer surface 112 or 114 is contiguous when in the closed position. If the outer surface 112 or 114 of the fastener 28 or 30 is receded from and not contiguous with the housing 26 or the skin, the closed-position adjuster 118 or 122 may be extended until the outer surface 112 or 114 is contiguous when in the closed position.

As the fasteners 28 or 30 rotate to the closed position, the drag coefficient of the fastening system 24 or the missile 22 (shown in FIG. 1) may be reduced. Once the fasteners 28 or 30 are in the closed position, as shown in FIG. 10, the drag coefficient may be lower than any other position of the fasteners 28 or 30 between the open and closed positions.

The drag coefficient $C_d$ may be a function of the perimeter length of the cross-sectional profile of the fastening system 24 shown in FIGS. 6-10. Closing each fastener 28 or 30 may reduce perimeter length of cross-sectional profile of the fastening system 24, thereby reducing a drag coefficient of the fastening system. For example, the perimeter length of the cross-sectional profile of the fastening system 24 when the fasteners 28 or 30 are closed may be anywhere from 60% to 95% of the perimeter when the fasteners 28 or 30 are open.

The actuator assembly 90 may actuate the fasteners 28 or 30 in reverse to the above described operation described in reference to FIGS. 6-10. For example, pressure from the pressure source 152 may be lowered to allow the closing piston 170 or 172 to retract. Retracting the closing piston 170 or 172 may allow the corresponding fastener 28 or 30 to rotate to the open position. Once the fastener 28 or 30 is in the open position, the locking piston 178 or 180 may extend to lock the fastener 28 or 30 in the open position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fastening system for securing an expendable aircraft store to an aircraft, including:
   a body that is configured to form part of the expendable aircraft store, the body extending along a longitudinal axis;
   a first fastener rotatably connected to the body, wherein the first fastener is rotatable about a first fastening axis; and
   a second fastener rotatably connected to the body opposite the first fastener relative to the longitudinal axis of the body, wherein the second fastener is rotatable about a second fastening axis, and wherein the second fastener is rotatable about a portion of the second fastening axis that is laterally offset from the longitudinal axis opposite the first fastening axis;
   wherein each fastener includes an engagement section for securing the respective fastener to a mechanical interface of the aircraft, each engagement section being radially outward of the respective fastening axis;
   wherein each fastener is rotatable from an open position, wherein the respective engagement section is engageable with the mechanical interface of the aircraft, to a closed position that reduces a drag coefficient of the fastening system compared to the open position, wherein when each fastener is in the closed position each longitudinal end of each fastener is flush with the body; and
   wherein the fastening system further includes first and second closed position adjusters comprising, a first movable protrusion and a second movable protrusion configured to adjust the closed position of the first fastener and second fastener, respectively, that are each extendable relative to the body, wherein the movable protrusions are extendable radially relative to the longitudinal axis to contact a respective radially inwardly facing surface of the corresponding first fastener or second fastener when each fastener is in the closed position, whereby each movable protrusion is extendable to a respective position wherein each longitudinal end of each fastener is flush with the body when each fastener contacts the corresponding movable protrusion.

2. The fastening system of claim 1, wherein each fastener includes a leg for distributing load when the respective fastener is in the open position.

3. The fastening system of claim 2, wherein the body includes a longitudinally-extending support with a leg-bearing surface for distributing load received from each leg when the respective fastener is open.

4. The fastening system of claim 3, wherein the longitudinally-extending support further includes:
a laterally-extending portion; and
a spacer body that forms the leg-bearing surface such that the spacer body contacts the leg of the first fastener or the second fastener when the respective fastener is open.

5. The fastening system of claim 1, whereing each movable protrusion is a set screw.

6. The fastening system of claim 1, wherein each fastener rotates about a corresponding load-bearing pin that is radially fixed to the body.

7. The fastening system of claim 1, wherein when the fasteners are in the open position the fasteners are positively locked open, or when the fasteners are in the closed position the fasteners are positively locked closed.

8. The fastening system of claim 1, further including: an actuator assembly operably connected to each fastener such that actuation of the actuator assembly actuates each fastener to the closed position.

9. The fastening system of claim 8, wherein the actuator assembly includes a pneumatic actuator operably connected to at least one of the fasteners.

10. An expendable aircraft store including the fastening system of claim 1, wherein rotating each fastener from the open position to the closed position reduces a drag coefficient of the expendable aircraft store compared to the open position.

11. The expendable aircraft store of claim 10, wherein the expendable aircraft store is a missile.

12. An aircraft including a mechanical interface connected to the fasteners of the fastening system of the expendable aircraft store of claim 10.

13. An aircraft including:
the expendable aircraft store of claim 10;
wherein the fastening system further includes:
an actuator assembly operably connected to each fastener to positively lock the fasteners in the open position, to dose the fasteners, to open the fasteners, or to positively lock the fasteners in the closed position, wherein the actuator assembly includes a pneumatic actuator;
wherein each fastener includes a leg for distributing load when the respective fastener is in the open position;
wherein the body includes a longitudinally-extending support with a leg-bearing surface for distributing load received from each leg when the respective fastener is open;
wherein the longitudinally-extending support further includes:
a laterally-extending portion; and
a spacer body that forms the leg-bearing surface such that the spacer body contacts the leg of the first fastener or the second fastener when the respective fastener is open;
wherein each movable protrusion is a set screw;
wherein each fastener rotates about a corresponding load-bearing pin that is radially fixed to the body; and
wherein when the fasteners are in the open position the fasteners are positively locked open, or when the fasteners are in the closed position the fasteners are positively locked closed.

14. The aircraft of claim 13, wherein the engagement section of the first fastener includes a first protrusion that is engageable with a first concave surface of the mechanical interface of the aircraft and the engagement section of the second fastener includes a second protrusion that is engageable with a second concave surface of the mechanical interface.

15. The fastening system of claim 1, wherein the body includes a longitudinally-extending support between the first fastener and the second fastener, wherein the longitudinally-extending support includes:
a first radially outwardly opening cavity that receives a protrusion of the engagement section of the first fastener when the first fastener is in the closed position; and
a second radially outwardly opening cavity that receives a protrusion of the engagement section of the second fastener when the second fastener is in the closed position.

16. The fastening system of claim 15, wherein the longitudinally-extending support includes a radially outwardly extending protrusion that partially defines the first radially outwardly opening cavity and the second radially outwardly opening cavity; and
wherein a radially outwardly facing surface of the radially outwardly extending protrusion is circumferentially between the first fastener and the second fastener, such that when each fastener is in the closed position each circumferential end of the radially outwardly facing surface is flush with an adjacent radially outwardly facing surface of the corresponding first fastener or second fastener.

17. A method of operating a fastening system for securing an expendable aircraft store to an aircraft, including;
providing a body that is configured to form part of the expendable aircraft store, the body extending along a longitudinal axis;
rotating a first fastener about a first fastening axis, wherein the first fastener is rotatably connected to the body; and
rotating a second fastener about a second fastening axis that is laterally offset from the first fastening axis relative to the longitudinal axis, wherein the second fastener is rotatably connected to the body;
extending a first movable protrusion of a first closed position adjuster of the fastening system, relative to the body to adjust the closed position of the first fastener; and
extending a second movable protrusion of a second closed position adjuster of the fastening system, relative to the body to adjust the closed position of the second fastener, wherein each movable protrusion is extended radially relative to the longitudinal axis to contact a respective radially inwardly facing surface of the corresponding first fastener or second fastener when each fastener is in the closed position, whereby each movable protrusion is extended to a respective position wherein each longitudinal end of each fastener is flush with the body when each fastener contacts the corresponding movable protrusion;

wherein each fastener includes an engagement section for securing the respective fastener to a mechanical interface of the aircraft, each engagement section being radially outward of the respective fastening axis; and wherein each fastener is rotatable from an open position, wherein the respective engagement section is engageable with a mechanical interface of the aircraft, to a closed position that reduces a drag coefficient of the fastening system compared to the open position, wherein when each fastener is in the closed position each longitudinal end of each fastener is flush with the body.

18. The method of claim 17, further including: rotating each fastener from the open position to the closed position, thereby reducing the drag coefficient of the fastening system.

19. The method of claim 17, further including: actuating an actuator assembly that is operably connected to each fastener to positively lock the fasteners in the open position, to close the fasteners, to open the fasteners, or to positively lock the fasteners in the closed position.

20. The method of claim 17, further including:
launching the expendable aircraft store, and rotating the fasteners of the launched expendable aircraft store to the closed position, thereby reducing the drag coefficient of the expendable aircraft store.

21. The method of claim 17, further including: adjusting the open position of the first fastener or the second fastener with a spacer body that forms a bearing surface that is arranged to contact the respective fastener, when open.

22. The method of claim 17, wherein each movable protrusion is a set screw.

* * * * *